US012158267B2

(12) United States Patent
Giebel

(10) Patent No.: US 12,158,267 B2
(45) Date of Patent: Dec. 3, 2024

(54) ADJUSTABLE LOW PRESSURE REGULATOR FOR FEEDING GAS TO OUTDOOR COOKING STATION AND METHOD THEREOF

(71) Applicant: North Atlantic Imports, LLC, Logan, UT (US)

(72) Inventor: Michael R. Giebel, Joplin, MO (US)

(73) Assignee: North Atlantic Imports, LLC, Logan, UT (US)

( * ) Notice: Subject to any disclaimer, the term of this patent is extended or adjusted under 35 U.S.C. 154(b) by 498 days.

(21) Appl. No.: 17/461,904

(22) Filed: Aug. 30, 2021

(65) Prior Publication Data

US 2022/0065448 A1    Mar. 3, 2022

Related U.S. Application Data

(60) Provisional application No. 63/072,653, filed on Aug. 31, 2020.

(51) Int. Cl.
*F23N 1/00* (2006.01)
*A47J 37/07* (2006.01)

(52) U.S. Cl.
CPC .......... *F23N 1/007* (2013.01); *A47J 37/0713* (2013.01); *F23N 2235/16* (2020.01); *F23N 2235/24* (2020.01); *F23N 2239/04* (2020.01)

(58) Field of Classification Search
CPC .. A47J 37/0713; F23N 1/007; F23N 2235/16; F23N 2239/04; F23N 2235/24; F23K 2900/05002; F17C 2205/0338
See application file for complete search history.

(56) References Cited

U.S. PATENT DOCUMENTS

| | | |
|---|---|---|
| 4,809,740 A | 3/1989 | Nevlud |
| 4,951,722 A | 8/1990 | Nitzberg et al. |
| 5,462,081 A | 10/1995 | Perusek et al. |
| 5,560,343 A | 10/1996 | Werkmann et al. |
| 5,613,518 A | 3/1997 | Rakieski |
| 6,209,562 B1 | 4/2001 | Shaw |
| 6,367,775 B1 | 4/2002 | Nimberger |
| 6,408,869 B1 | 6/2002 | Bartos et al. |
| 6,513,545 B2 | 2/2003 | Rhone et al. |
| 6,530,396 B1 | 3/2003 | Frey |
| 6,910,499 B2 | 6/2005 | Chan |
| 2004/0221893 A1 | 11/2004 | Johnson |
| 2005/0166969 A1* | 8/2005 | Olds .................. G05D 16/0686 137/505.46 |
| 2010/0313971 A1* | 12/2010 | Moore .................. F16K 31/365 137/15.19 |
| 2011/0232779 A1 | 9/2011 | Oh |
| 2019/0264847 A1* | 8/2019 | Blanchard ............. F16L 25/023 |
| 2020/0191402 A1* | 6/2020 | Jaggard ............... A47J 37/0713 |

* cited by examiner

*Primary Examiner* — Alfred Basichas
(74) *Attorney, Agent, or Firm* — David L. Stott

(57) ABSTRACT

Embodiments of a pressure regulator for delivering gas to a cooking station. The pressure regulator includes a body defining a gas inlet and a gas outlet. The body also includes a knob coupled to the body, the knob manually rotatable about an axis defined by the knob. The pressure regulator also includes a lever arm within the body. The lever arm extends to an end portion positioned adjacent the gas inlet, the lever arm pivotable via rotation of the knob such that rotation of the knob adjusts gas flow pressure through the body between about 11 inches of water column and about 8.5 inches of water column.

21 Claims, 4 Drawing Sheets

ADJUSTABLE LOW PRESSURE REGULATOR FOR FEEDING GAS TO OUTDOOR COOKING STATION AND METHOD THEREOF

CROSS-REFERENCE TO RELATED APPLICATIONS

This application claims the benefit of U.S. Provisional Application No. 63/072,653, filed Aug. 31, 2020, the disclosure of which is hereby incorporated by reference herein it its entirety.

TECHNICAL FIELD

The present invention relates generally to regulating the feeding of fuel to a cooking station and, more specifically, the present invention relates to a low pressure adjustable regulator for feeding propane from a propane tank to a cooking station.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process. Further, gas type fuel for grilling for many has become the favored type due to the advantages related to time efficiency of gas type outdoor grilling. However, one problem with gas type fuel is controlling the amount of fuel that can be delivered to an outdoor cooking station.

BRIEF SUMMARY OF THE INVENTION

The present invention is directed to various embodiments of a pressure regulator for delivering gas to an outdoor cooking station. In one embodiment, the pressure regulator includes a body and a lever arm. The body includes a knob rotatably coupled to the body, the knob manually rotatable about an axis defined by the knob. The body defines a gas inlet and a gas outlet. The lever arm with an end portion positioned adjacent the gas inlet, the lever arm pivotable via rotation of the knob such that rotation of the knob adjusts gas flow pressure through the body between about 15 inches of water column and about 7.5 inches of water column.

In another embodiment, the knob is rotatable to adjust gas flow pressure through the body about 11 inches of water column and about 8.5 inches of water column. In another embodiment, the knob is rotatable to linearly move an axil, the axil operatively coupled to at least one spring, the at least one spring operatively coupled to the lever arm. In another embodiment, the knob is rotatable to linearly move a relief pin, the relief pin operatively coupled to at least one spring and the lever arm. In another further embodiment, the relief pin is linearly movable along the axis defined by the knob and relative to the body.

In another embodiment, the pressure regulator further includes a compartment, the compartment defined at least partially by the body and a diaphragm, the diaphragm moveable between an expanded position and a compressed position. In another embodiment, wherein, upon the diaphragm being in the compressed position, the lever arm is in a first pivoted position and, upon the diaphragm being in the expanded position, the lever arm is in a second pivoted position. In another embodiment, the diaphragm extends alongside a diaphragm plate.

In accordance with another embodiment of the present invention, an outdoor cooking station configured to be gas heated with a propane tank is provided. The outdoor cooking station includes a main body and an elongated interconnection member. The main body includes gas burners configured to receive pressurized gas from the propane tank. The elongated interconnection member extends between a first end portion and a second end portion, the first end portion sized and configured to be coupled to the propane tank and the second end portion sized and configured to be operatively coupled to the gas burners so that gas can move from the propane tank to the gas burners of the main body. The outdoor cooking station also includes a pressure regulator. The pressure regulator is positioned between the first end portion and the second end portion of the interconnection member. The pressure regulator includes a body and a lever arm positioned within the body, the body having a knob rotatably coupled to the body. The knob manually rotatable about an axis defined by the knob, the body defining a gas inlet and a gas outlet. The lever arm extends with an end portion positioned adjacent the gas inlet, the lever arm pivotable via rotation of the knob such that rotation of the knob is configured to adjust gas flow pressure through the body between about 15 inches of water column and about 7.5 inches of water column.

In another embodiment, the knob is rotatable to adjust gas flow pressure through the body about 11 inches of water column and about 8.5 inches of water column. In another embodiment, the interconnection member includes a flexible gas hose extending from the pressure regulator to the second end portion of the interconnection member. In another embodiment, the knob is rotatable to linearly move an axil, the axil operatively coupled to at least one spring, the at least one spring operatively coupled to the lever arm. In still another embodiment, the knob is rotatable to linearly move a relief pin, the relief pin operatively coupled to at least one spring and the lever arm. In another embodiment, the relief pin is linearly movable along the axis defined by the knob and relative to the body.

In another embodiment, the pressure regulator further includes a compartment, the compartment defined at least partially by the body and a diaphragm, the diaphragm moveable between an expanded position and a compressed position. In still another embodiment, upon the diaphragm being in the compressed position, the lever arm is in a first pivoted position and, upon the diaphragm being in the expanded position, the lever arm is in a second pivoted position. In another embodiment, the diaphragm extends alongside a diaphragm plate.

In accordance with another embodiment of the present invention, a method for changing a fuel pressure to gas burners of a cooking station is provided. The method includes the steps of: providing a propane tank configured to feed fuel to the gas burners of the cooking station such that an interconnection member extends between the propane tank and the cooking station, the interconnection member having a gas hose and a pressure regulator each extending between the propane tank and the cooking station; turning a propane tank knob of the propane tank to an open position; and adjusting a pressure of the propane gas being fed to the cooking station by moving a pressure regulator knob of the pressure regulator such that the pressure of the propane gas being fed through the pressure regulator is adjustable between about 15 inches of water column and about 7.5 inches of water column.

In another embodiment, the adjusting step includes the step of adjusting the pressure of the propane gas between about 11 inches of water column and about 8.5 inches of water column. In another embodiment, the adjusting step includes the step of moving an axil linearly to move an end portion of a lever arm to and from a gas inlet of the pressure regulator. In another embodiment, the adjusting step includes the step of minimizing the pressure of the propane gas moving through pressure regulator by expanding a compartment of the pressure regulator such that the compartment is defined at least partially by a flexible diaphragm. In still another embodiment, the adjusting step includes the step of changing a size of a compartment of the pressure regulator with movement of a flexible diaphragm, the flexible diaphragm moveable with movement of the pressure regulator knob. In a further embodiment, the changing step includes the step of expanding the compartment to minimize the pressure of the propane gas being fed through the pressure regulator.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
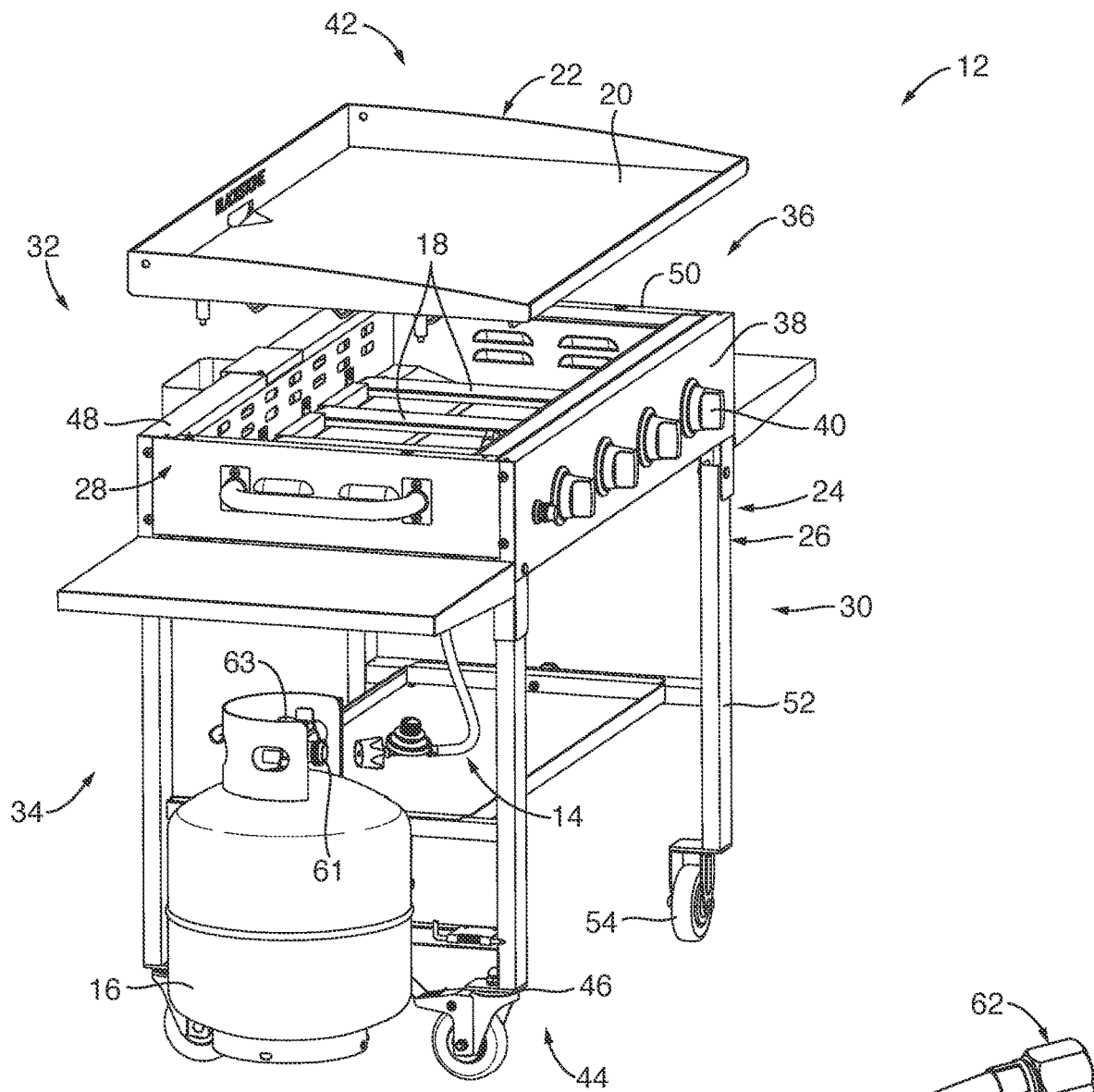
FIG. 1 is a perspective side view of an outdoor cooking station, depicting an interconnection member for coupling between a propane tank and the outdoor cooking station, according to an embodiment of the present invention.
Figure 2:
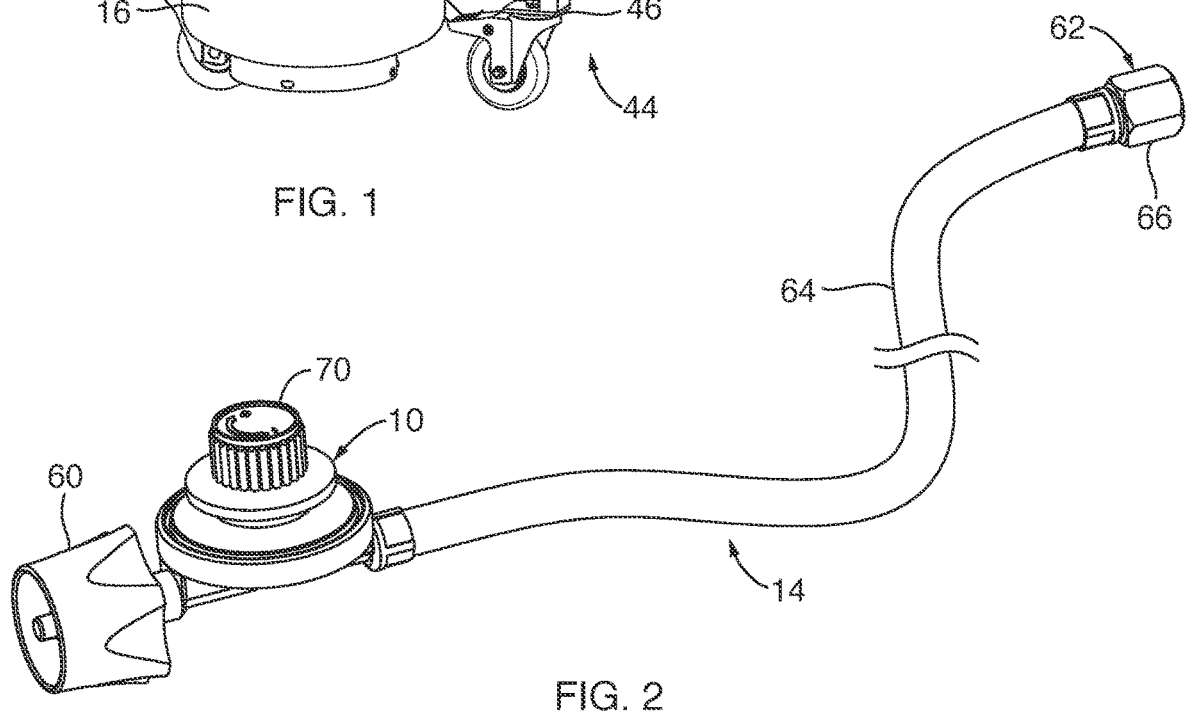
FIG. 2 is a perspective view of the interconnection member, the interconnection member having an adjustable low pressure regulator associated therewith, according to another embodiment of the present invention.
Figure 3:
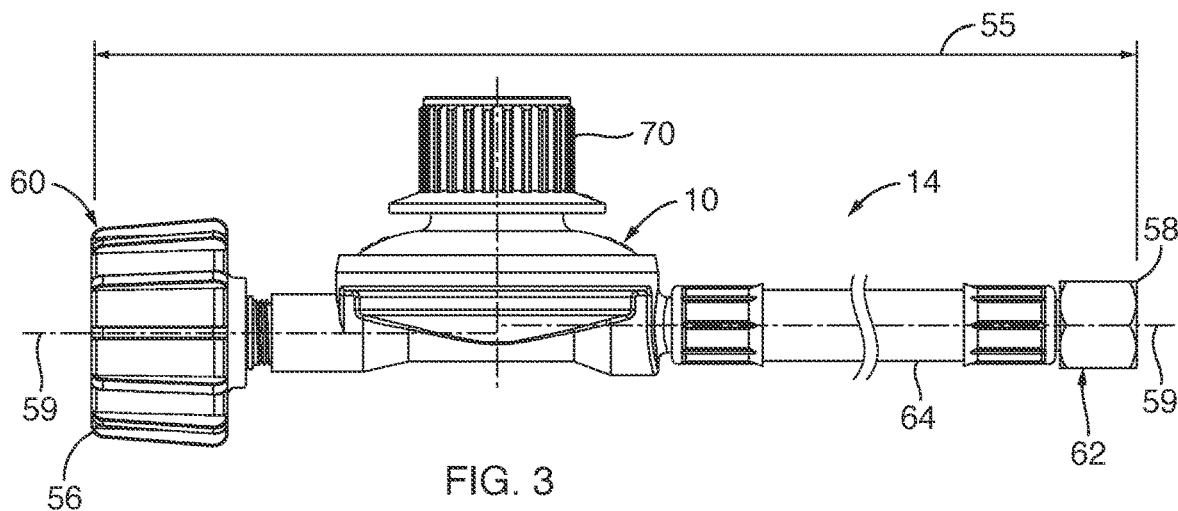
FIG. 3 is a side view of the interconnection member of FIG. 2, according to another embodiment of the present invention.

Referring to FIGS. 1 and 2, a pressure regulator 10 integrated with the connection components for feeding fuel, such as propane gas, to a cooking station 12 is provided. For example, in one embodiment, such pressure regulator 10 may be a portion of an interconnection member 14 sized and configured to feed fuel from a propane tank 16 to the cooking station 12. Further, the pressure regulator 10 may be sized and configured to facilitate manual adjustment of the gas pressure and amount of gas being fed to the cooking station 12 from a typical gas pressure level to various lower pressure levels, relative to the typical pressure level. In this manner, the pressure regulator 10 discussed herein may facilitate minimizing gas pressure (relative to a typical gas pressure) configured to be supplied or fed to a cooking station so that a user may cook at lower temperatures or to be more fuel efficient, for example.

The cooking station 12 may be of the type for outdoor use and may also be portable. The cooking station 12 may be any type of outdoor cooking station sized and configured to be gas fueled. As such, the cooking station 12 may include multiple gas burners 18 positioned below a cooking surface 20. The cooking surface 20 may be a griddle 22, as depicted. In another embodiment, the cooking surface 20 may be a grill type surface. The outdoor cooking station 12 may extend with a main body 24 with a frame structure 26 and panels 28 coupled to the frame structure 26. The main body 24 may extend to define a front side 30, a rear side 32, a first side 34 and a second side 36. The front side 30 may be opposite the rear side 32 and the first side 34 may be opposite the second side 36. The front side 30 may include a front panel 38 with multiple burner valve knobs 40 each associated with one of the gas burners 18 such that the gas burners 18 may be supported by the main body 24 so as to extend between the front and rear sides 30, 32 of the main body 24. Further, the main body 24 may define a top side 42 and a bottom side 44, the top side 42 extending opposite the bottom side 44. The burner valve knobs 40 may be sized and configured to be manually rotated to various positions and configured to feed gas to the gas burners 18 at various controlled levels or amounts corresponding to the various positions, as known to one of ordinary skill in the art. The cooking station 12 may include various other structural components integrated or associated therewith that may be employed and/or may be necessary to facilitate delivering gas to the gas burners 18 and facilitate causing the gas burners 18 to burn, as known by one of ordinary skill in the art.

The main body 24 may also extend between a lower end 46 and an upper end 48. The upper end 48 may extend to define an edge 50 sized and configured to support the griddle 22 or the grill. In one embodiment, the main body 24 may support a hood (not shown) that may be pivotably coupled to the griddle 22 or pivotably coupled adjacent the upper end 48 of the main body 24 so as to cover the griddle 22 or grill. The main body 24 may also include multiple legs 52 with two or more wheels 54. In another embodiment, each of the legs 52 may exhibit one wheel 54, such as four caster wheels, at the lower end 46 of the main body 24. In this manner, the two or more wheels 54 of the cooking station 12 may readily facilitate portability of the cooking station 12. In another embodiment, the cooking station 12 may be an insert type cooking station 12 sized and configured to maintain a fixed position relative to cabinets or a counter the cooking station 12 is positioned within. As such, the cooking station 12 can be any type of gas fueled cooking station that may be employed with the interconnection member 14 having the pressure regulator 10, as set forth herein.

With reference to FIGS. 1-5, as previously set forth, the interconnection member 14 may extend between the propane tank 16 and the cooking station 12. The interconnection member 14 may be an elongated structure defining a length 55 that extends between first and second ends 56, 58 and defines a longitudinal axis 59 along the length of the elongated structure. The first end 56 may be associated with a propane coupling member 60 and the second end 58 may be associated with a cooking station coupling member 62 with the pressure regulator 10 and a hose 64 therebetween. The hose 64 may be sized and configured to deliver gas therethrough and may be flexible (as depicted in FIGS. 1 and 2). The propane coupling member 60 may include a valve with a safety tripping switch (not shown) sized and configured to couple to the propane tank 16, the safety tripping switch configured to automatically shut-off gas flow from the propane tank upon there being an un-safe amount of propane being delivered from the propane tank 16, as known to one of ordinary skill in the art. Further, the propane coupling member 60 of the interconnection member 14 may be coupled directly to a threaded portion 61 of the propane tank 16 such that the propane tank may include a gas knob that may be rotated between open and closed positions, the open position facilitating feeding gas from the propane tank 16, through the pressure regulator 10 and to the cooking station 12. The cooking station coupling member 62 may be in the form of a nut 66, the nut 66 sized and configured to be operatively coupled to the structural components necessary for delivering propane gas to the gas burners 18. The nut 66 may be rotatably coupled to one end of the hose 64.

Further, the pressure regulator 10 may include a rotatable knob 70 thereon. Such rotatable knob 70 may be rotated, as shown by arrow 76, between a maximum pressure position 72 and a minimum pressure position 74. Such maximum and minimum pressure positions 72, 74 may be indicated on the pressure regulator 10 with markings and may exhibit indicia for such markings in the form of "MAX" and "LOW," respectively, on the pressure regulator 10 with a knob marking 78 on the knob 70 indicating the position of the rotatable knob 70 relative to the maximum and minimum pressure positions 72, 74. In one embodiment, the rotatable knob 70 may be rotated, in total, about 180 degrees, between the maximum and minimum pressure positions 72, 74. In the minimum pressure position 74, the pressure regulator 10 is not in a closed-off position, but rather, is a position that delivers gas in a minimal amount to the cooking station 12 so long as gas from the propane tank 16 is applying pressure to the pressure regulator 10 such that gas knob 63 of the propane tank 16 is in an open position. Such minimal amount for delivering gas may be helpful for minimizing a heating temperature, similar to a simmering arrangement, of the cooking station 12 and/or for the purpose of increasing fuel efficiency. With this arrangement, the interconnection member 14 may be employed to feed fuel to the cooking station 12 with the propane coupling member 60 sized and configured to be directly coupled to the propane tank 16 and the cooking station coupling member 62 sized and configured to be directly coupled to the cooking station 12 such that the pressure regulator 10 may be manually turned to a desired position so as to adjust or manipulate the amount of gas flow through the interconnection member 14.

Figure 4:
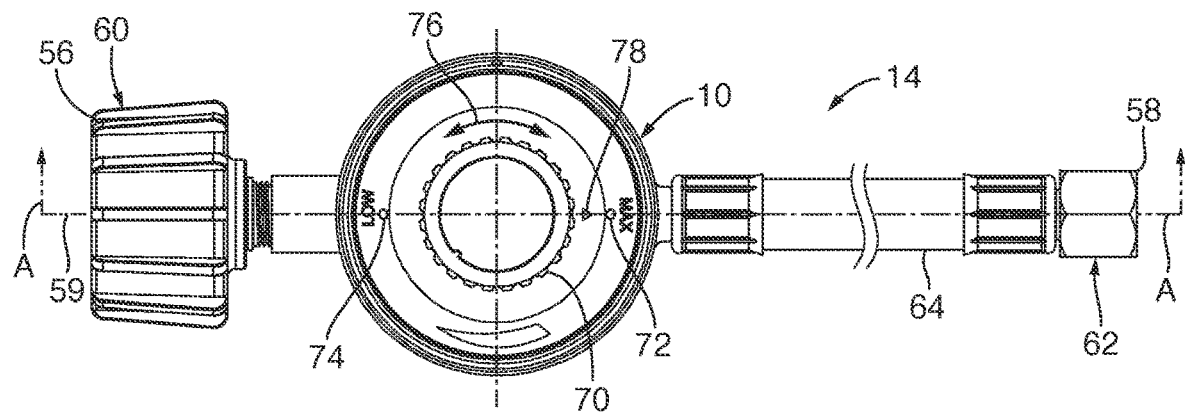
FIG. 4 is a top view of the interconnection member of FIG. 2, according to another embodiment of the present invention.
Figure 5:
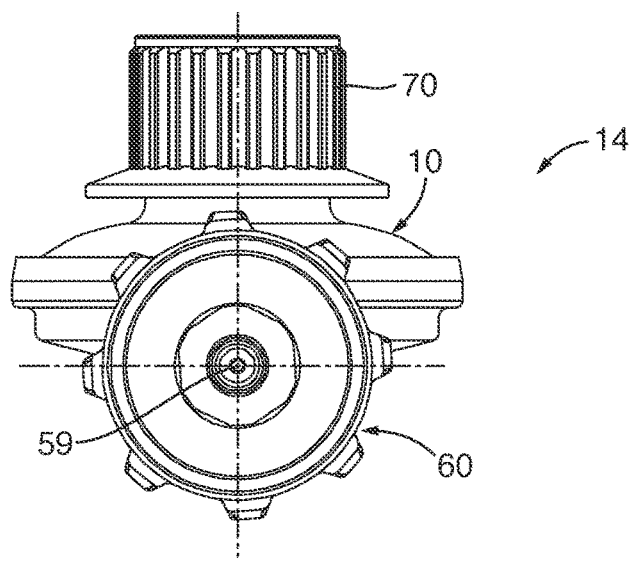
FIG. 5 is an end view of the interconnection member of FIG. 2, according to another embodiment of the present invention.
Figure 6:
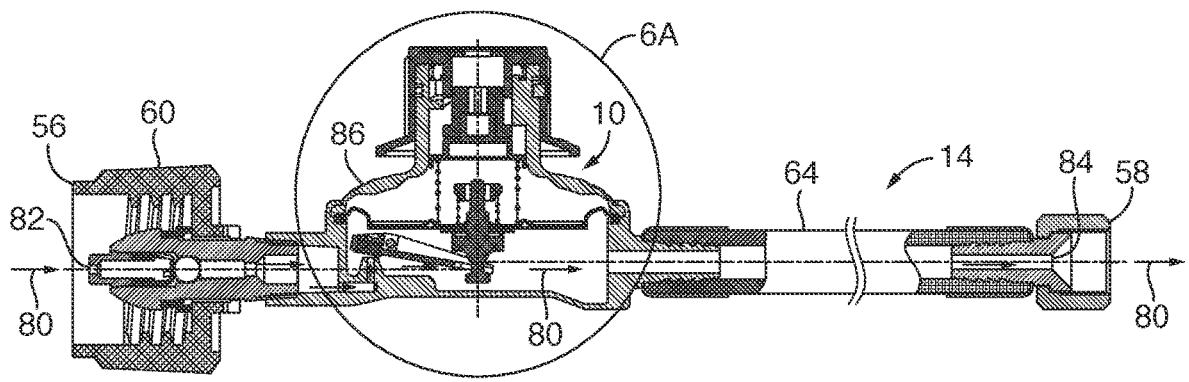
FIG. 6 is a cross-sectional view of the interconnection member taken along section line A-A of FIG. 4, depicting the adjustable low pressure regulator in a maximized pressure position, according to another embodiment of the present invention.
Figure 7:
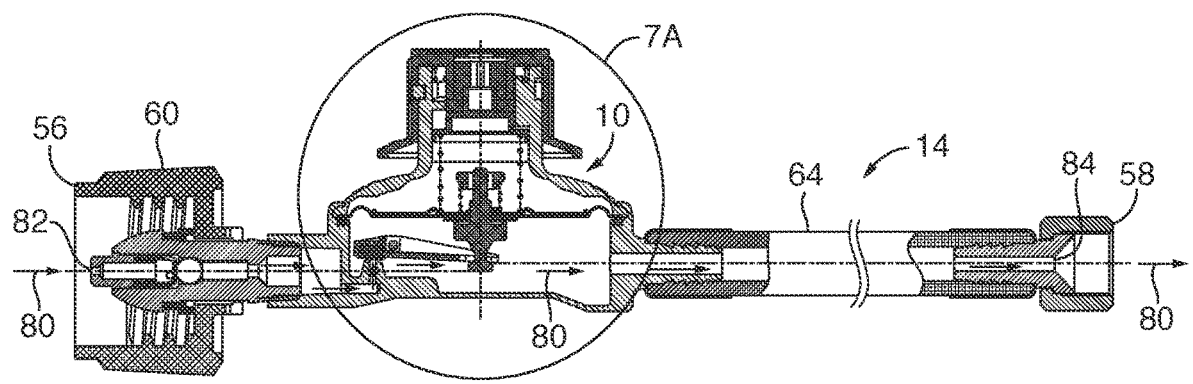
FIG. 7 is a cross-sectional view of the interconnection member, depicting the adjustable low pressure regulator in a minimized pressure position, according to another embodiment of the present invention.

Now with reference to FIGS. 4, 6 and 7, gas flow is depicted with arrow 80 through the interconnection member 14 with the pressure regulator 10 in the maximum pressure position 72 (FIG. 6) and the minimum pressure position 74 (FIG. 7). Although not shown in FIG. 4, such gas flow 80 assumes that propane coupling member 60 is coupled to the threaded portion 61 of the propane tank 16 and with the gas knob 63 of the propane tank 16 turned to an open position, thereby facilitating gas flow 80 from the propane tank 16 (see FIG. 1). The interconnection member 14 defines a gas inlet 82 and a gas outlet 84 adjacent the respective first and second ends 56, 58 of the interconnection member 14, the inlet 82 and the outlet 84 of the interconnection member 14 sized and configured to pass propane gas therethrough. For example, at the first end 56, the gas inlet 82 receives gas from the propane tank 16 (FIG. 1) such that, upon the propane tank being opened, pressurized gas may flow from the propane tank 16 and through the gas inlet 82 such that gas flows through the propane tank coupling member 60 and toward the pressure regulator 10. Further, gas flow may continue from the pressure regulator 10, through the hose 64 and through the gas outlet 84 to flow into components of the cooking station 12 (FIG. 1).

Figure 6A:
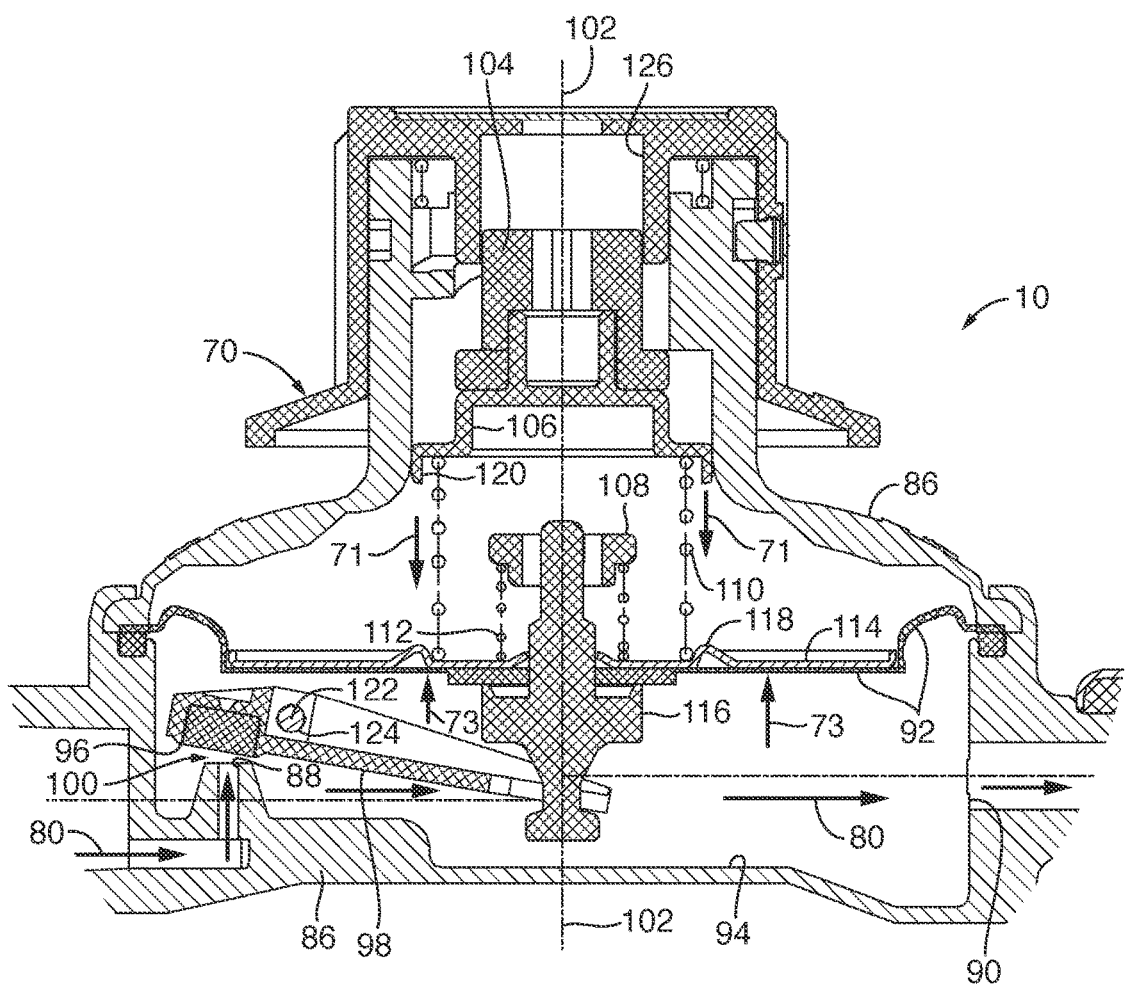
FIG. 6A is an enlarged view of the adjustable low pressure regulator taken from region 6A of FIG. 6, according to another embodiment of the present invention.

With reference to FIG. 6A, the pressure regulator 10 extends with a body 86 or frame or shell, the body 86 extending to at least partially define a pressure regulator inlet 88 and a pressure regulator outlet 90. Further, the pressure regulator 10 includes a diaphragm 92, the body 86 and diaphragm 92 extending to at least partially define a compartment 94. As gas flows through the pressure regulator inlet 88, the gas flows into the compartment 94 within the pressure regulator 10 such that pressurized gas flowing through the pressure regulator inlet 88 may provide a gas force 73 pushing upward upon the diaphragm 92. This gas force 73 applied upward to the diaphragm 92 may be equal to the area of the diaphragm times the amount of pressure of the gas. The compartment 94 may move between expanded and contracted positions (see FIG. 7A) via movement of the diaphragm 92, discussed further herein. As the gas flows through the pressure regulator inlet 88, the gas flows adjacent an end portion 96 of a lever arm 98. The end portion 96 of the lever arm 98 may be positioned adjacent to the pressure regulator inlet 88 so as to define a space 100 (see FIG. 6A) therebetween. The space 100 may change between the maximum and minimum pressure positions 72, 74 (FIG. 6) of the pressure regulator 10 as the diaphragm 92 moves from a lowest position and a highest position. As depicted by arrow 80, the gas flows through the compartment 94 and through the pressure regulator outlet 90 so as to then move through various tubular components, such as the hose 64 and through the gas outlet 84 of the interconnection member 12 (see FIGS. 6A and 7A). The gas flowing from the gas outlet 84 of the interconnection member 14 is configured to feed toward and into the gas burners 18 of the cooking station 12 (FIG. 1).

Figure 7A:
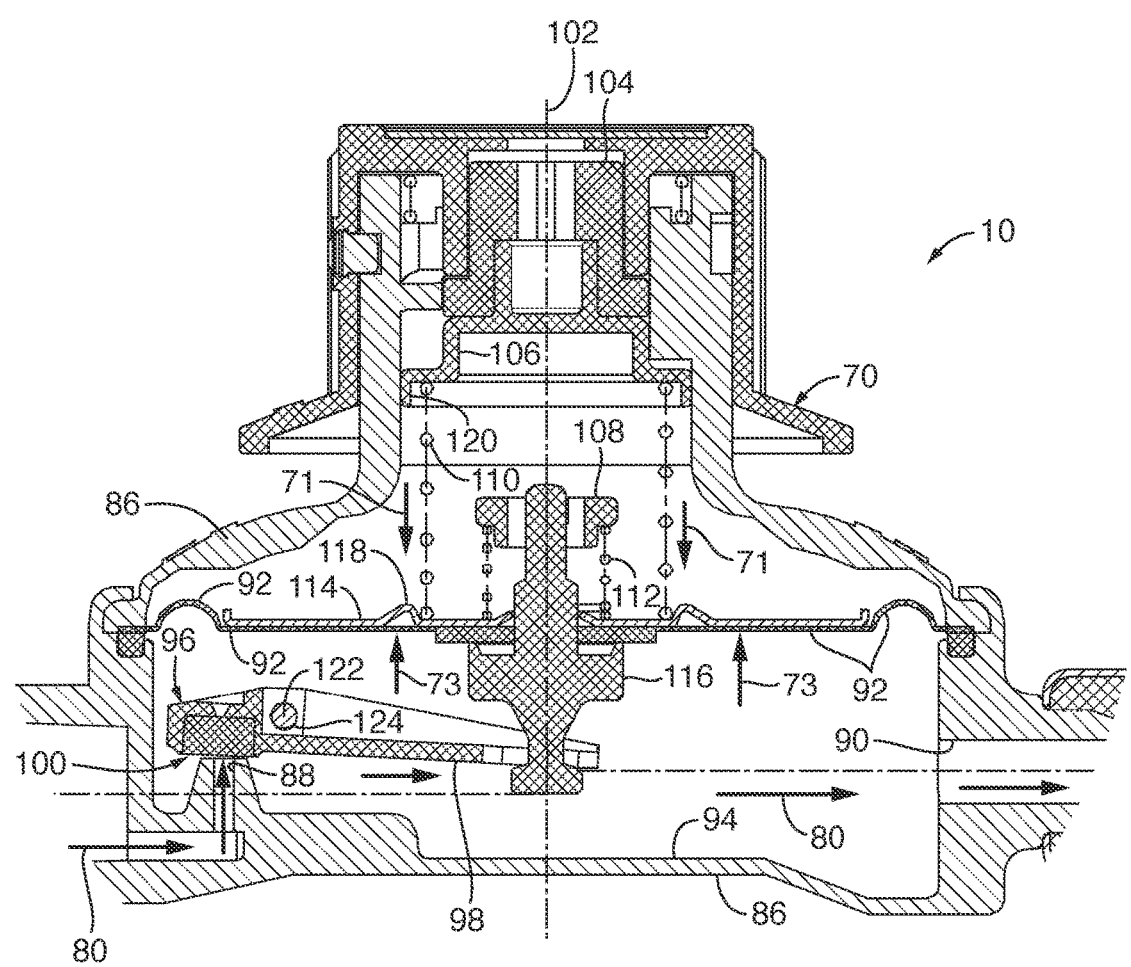
FIG. 7A is an enlarged view of the adjustable low pressure regulator taken from region 7A of FIG. 7, according to another embodiment of the present invention.

Now with reference to FIGS. 4, 6A and 7A, enlarged cross-sectional views of the pressure regulator are depicted with the knob 70 in the maximum pressure position 72 (see FIG. 6A) and the minimum pressure position 74 (see FIG. 7A). Similar to that previously set forth, description of FIGS. 6A and 7A assume that the propane coupling member 60 is coupled to the threaded portion 61 of the propane tank 16 and with the gas knob 63 of the propane tank 16 turned to the open position, thereby facilitating gas flow 80 from the propane tank 16 (see FIG. 1). The maximum pressure position 72 of the knob 70 preferably is a default position as the maximum pressure position 72 facilitates a pressure that may be typical for conventional pressure regulators. The knob 70 of the pressure regulator 10 may be rotated from the default position or the maximum pressure position 72 to the minimum pressure position, which moves components within the pressure regulator 10 to minimize the gas flow 80 through the pressure regulator and, thus, to the cooking station 12. The pressure regulator 10 may include the knob 70 positioned over the body 86 of the pressure regulator 10, the knob 70 of the pressure regulator 10 rotatable about an axis 102 of the pressure regulator 10 and the axis 102 of the knob 70. As the knob 70 is rotated, various components of the pressure regulator 10 may cooperate together to change or adjust the pressure of the gas being delivered or fed through the pressure regulator 10. With the knob 70 in the maximum pressure position 72, the pressure regulator 10 may feed gas to the cooking station 12 at a pressure of about 11 inches of water column. Such level of pressure is what typical pressure regulators provide, but such pressure regulators at that maximum level of pressure are not adjustable. With the knob 70 in the minimum pressure position 74, the pressure regulator 10 may feed gas to the cooking station 12 at a pressure of about 8.5 inches of water column. As such, the pressure regulator 10 may be sized and configured to adjust the pressure of gas flow toward the cooking station 12 to be anywhere between about 11 inches of water column and about 8.5 inches of water column by adjusting the knob 70 of the pressure regulator 10.

In one embodiment, the pressure regulator 10 may include various internal components that cooperate together with manual movement of the knob 70 about the axis 102 to change or adjust the pressure of the gas being delivered or fed through the pressure regulator 10. For example, in addition to the previously discussed diaphragm 92 and lever arm 98, other internal components of the pressure regulator 10 may include an axil 104, first and second spring caps 106, 108, first and second springs 110, 112, a diaphragm plate 114, and a relief pin 116. The relief pin 116 may be suspended within the diaphragm 92 with the first spring cap 106 and first spring 110, the first spring 110 being biased between the diaphragm plate 114 and the first spring cap 106. The first spring 110 may provide a spring force 71 or main spring force that may be configured to counter against or bias against the gas force 73 being applied against an underside of the diaphragm 92 in compartment 94, previously set forth. Further, the diaphragm plate 114 may exhibit a ridge 118 along one side of the diaphragm plate 114, the ridge 116 sized and configured to maintain one end of the first spring 110 in an upright position. The first spring cap 106 may extend with a flange 120 to also keep the first spring 110 in the upright position. The second spring 112 may be biased and positioned between the second spring cap 108 and the diaphragm plate 114 with the relief pin 116 positioned within the second spring 112 and extending through the diaphragm plate 114.

As the knob 70 is rotated about the axis 102, an inner surface of the knob 70 may cooperate with an outer surface of the axil 104 to move the axil 104 linearly along the axis 102 between a lower position (FIG. 6A) and an upper position (FIG. 7A). With the axil 104 in the lower position, the axil 104 may place compression upon the first spring 110 positioned between the first spring cap 106 and the diaphragm plate 114 and move the diaphragm plate 114 and diaphragm 92 downward to rotate the lever arm 98 about the pin 124 to therefore increase the opening 100 to allow greater flow of gas from the tank 16. In addition, as the diaphragm plate 114 and diaphragm 92 are compressed downward to bias against the gas force 73 placed against the underside of the diaphragm 92, the relief pin 116 also moves downward. Further, as the relief pin 116 moves downward, the lever arm 98 may pivot about a pin axis 122 defined by a pin 124 so that the end portion 96 may tilt upward to enlarge the space 100 defined between the pressure regulator inlet 88 and the end portion 96. In addition to the enlarged space 100, the compartment 94 may become compressed to provide a maximized pressure of gas moving through the pressure regulator 10. Further, this space 100 becomes reduced upon manually rotating the knob 70 to the minimum pressure position 74 such that the axil 104 moves to the upper position so that the axil 104 moves into a hollow space 126 defined in the knob 70. For example, movement of the knob 70 to the minimum pressure position 74 reduces the amount of compression on the first spring 110 or main spring which decreases the downward spring force 71 of the first spring 110. The gas force 73 being, for the moment, greater than the downward spring force 71, pushes the diaphragm 92 upward causing the lever arm 98 to rotate about pin 124 thereby decreasing the space 100. The decreased space 100 restricts momentarily the gas flow 80 into the area below the diaphragm 92. The gas flow 80 out of the regulator 10 being less than the gas flow into the regulator 10 causes the gas force 73 to decrease until it matches the downward spring force 71. The gas force 73 with the knob 70 rotated to the minimum pressure position 74 is now less than the gas force 73 was with the knob 70 rotated to the maximum pressure position 72. As such, as the knob 70 is manually rotated to move the axil 104 to the upper position, each of the diaphragm 92, diaphragm plate 114 and relief pin 116 move upward to expand the compartment 94. Further, the upward movement of the relief pin 116 pivots the lever arm 98 about the pin axis 122 so that the end portion 96 of the lever arm 98 moves closer to the pressure regulator inlet 88 to, thereby, reduce the space 100 defined between the end portion 96 the pressure regulator inlet 88. With this reduced space 100 adjacent the pressure regulator inlet 88 and the compartment 94 being expanded (via movement of the diaphragm 92), the pressure of the propane gas flowing through the pressure regulator can be minimized to about 8.5 inches of water column. Further, the lever arm 98 may extend at an angle (such as different angles) relative to the longitudinal axis 59 upon the knob 70 being moved to the maximum pressure position 72 or to the minimum pressure position 74. In this manner, the pressure regulator 10 may be sized and configured to adjust the pressure of the propane gas flowing through the pressure regulator 10.

Furthermore, upon the gas knob 63 of the propane tank 16 being in the open position so that gas may flow through the pressure regulator 10, manually moving the burner valve knobs 40 to a desired level may also adjust the components of the pressure regulator until the internal components reach equilibrium. For example, when gas begins flowing from the pressure regulator 10, the pressure under the diaphragm 92 decreases, making the forces on the diaphragm 92 unbalanced. The downward spring force 71 of the first spring 110 may become greater than the upward gas force 73 under the diaphragm 92 such that the diaphragm 92 may move downward. When the diaphragm 92 moves downward, the lever arm 98 rotates about pin 124. This rotation lifts the end portion 96 (pad) off the pressure regulator inlet 88 allowing higher pressure gas within the compartment 94 below the diaphragm 92. The internal components of the pressure regulator 10 will reach equilibrium at the flow rate of the gas determined by the position of the burner valve knobs valves 40. When the burner valve knobs 40 are opened further to allow more gas to the gas flame burners 18, the internal components of the pressure regulator 10 will adjust to open the inlet orifice 88 more to allow more propane to flow through the regulator and through the valves of the burner valve knobs 40 and to the gas flame burners 18.

Also, when the burner valve knobs 40 are turned to the off or closed position, the high pressure from the propane tank 16 will continue to flow for a very short amount of time. This flow of high pressure propane under the diaphragm 92 pushes the diaphragm assembly upward and causes the lever arm 98 to rotate about pin 124. The end portion 96 on the lever arm 98 closes off the pressure regulator inlet 88, which causes the flow of gas to stop.

Further, as previously set forth, rotating the knob 70 of the pressure regulator 10 may adjust the internal components of the pressure regulator 10. For example, rotating the knob 70 of the pressure regulator 10 changes the amount of compression of the first spring 110. By turning the knob 70 and increasing the amount of force from the first spring 110, the diaphragm 92 moves downward, which will increase the opening of the pressure regulator inlet 88 to allow more high pressure gas to flow into the pressure regulator below the diaphragm 92. This flow of gas pushes the diaphragm 92 upward to then decrease the opening of the pressure regulator inlet 88, until the internal components reach equilibrium and stabilize. The rotation of the knob 70 of the pressure regulator 10 changes the compression of the first spring 110, which changes the amount of pressure needed to reach equilibrium and/or stop or minimize the flow of gas through the pressure regulator inlet 88.

As previously set forth, the pressure regulator 10 may preferably be sized and configured to be adjustable so that gas flow includes a pressure moving to the cooking station 12 to be anywhere between about 11 inches of water column and about 8.5 inches of water column, the adjustability being facilitated with manual movement of the knob 70 of the pressure regulator 10. In another embodiment, the pressure regulator 10 may be sized and configured to exhibit maximum pressure levels of anywhere between about 11 inches water column to about 13.5 inches water column or even higher of about 15 inches water column. As such, in some embodiments, the pressure regulator 10 may be sized and configured to adjust the pressure of gas flow toward the cooking station 12 to be anywhere between about 13.5 inches of water column and about 8.5 inches of water column by adjusting the knob 70 of the pressure regulator 10. In another embodiment, the pressure regulator 10 may be sized and configured to adjust the pressure of gas flow toward the cooking station 12 to be anywhere between about 15 inches of water column and about 8.5 inches of water column by adjusting the knob 70 of the pressure regulator 10. In still another embodiment, the pressure regulator 10 may be sized and configured to exhibit minimum pressure levels of about 8 inches of water column or even about 7.5 inches of water column. As such, in some embodiments, the pressure regulator 10 may be sized and configured to adjust the pressure of gas flow toward the cooking station 12 to be anywhere between about 11 inches of water column and about 8 inches of water column. In still another embodiment, the pressure regulator 10 may be sized and configured to adjust the pressure of gas flow toward the cooking station 12 to be anywhere between about 11 inches of water column and about 7.5 inches of water column by adjusting the knob 70 of the pressure regulator 10. In still another embodiment, the pressure regulator 10 may be sized and configured to adjust the pressure of gas flow toward the cooking station 12 to be anywhere between about 15 inches of water column and about 7.5 inches of water column by adjusting the knob 70 of the pressure regulator 10. In this manner, the pressure regulator 10 may be adjusted to various levels of pressure above and below that which is found in typical fixed pressure regulators.

The various structural components of the interconnection member 14 as well as the structural components of the cooking station 12 may be formed of various metallic materials, such as steel, stainless steel, copper, brass, aluminum or any other suitable material with high temperature ratings, such as various suitable polymeric materials. Further, the various structural components of the outdoor cooking station 12 and interconnection member 14 may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A pressure regulator for delivering gas to a cooking station, the cooking station being couplable to gas fuel controllable with a gas knob, the pressure regulator comprising:
    a body with a knob rotatably coupled to the body, the knob is manually rotatable about an axis defined by the knob, the body defining a gas inlet and a gas outlet;
    an axil linearly movable along the axis upon the knob being rotated;
    a first spring cap positioned directly below the axil and movable with the axil;
    a first spring positioned to bias against an underside surface of the first spring cap, the underside surface extending perpendicular relative to the axis of the knob;
    a diaphragm with a diaphragm plate positioned over the diaphragm, the diaphragm extending between inner sides of the body, the first spring positioned between the first spring cap and the diaphragm plate such that the first spring biases against the diaphragm plate and the underside surface of the first spring cap;
    a second spring cap positioned above diaphragm plate;
    a second spring positioned between the second spring cap and the diaphragm plate;
    a relief pin positioned within the second spring and extending through the diaphragm plate, the relief pin with one end portion coupled to the second spring cap; and
    a lever arm positioned within the body and pivotably coupled to a second end portion of the relief pin below the diaphragm, the lever arm having an end portion positioned adjacent the gas inlet such that, upon the gas knob being in an open position, the lever arm is pivotable via rotation of the knob such that rotation of the knob adjusts gas flow pressure through the body between about 15 inches of water column and about 7.5 inches of water column.

2. The pressure regulator of claim 1, wherein the knob is rotatable to adjust gas flow pressure through the body between about 11 inches of water column and about 8.5 inches of water column.

3. The pressure regulator of claim 1, further comprising a compartment, the compartment defined at least partially by the body and the diaphragm, the diaphragm moveable between an expanded position and a compressed position.

4. The pressure regulator of claim 3, wherein, upon the diaphragm being in the compressed position, the lever arm is in a first pivoted position and, upon the diaphragm being in the expanded position, the lever arm is in a second pivoted position.

5. The pressure regulator of claim 3, wherein the diaphragm extends directly alongside the diaphragm plate.

6. The pressure regulator of claim 1, wherein the knob is rotatable to linearly move the relief pin, the relief pin operatively coupled to the first and second springs and the lever arm.

7. The pressure regulator of claim 6, wherein the relief pin is linearly movable along the axis defined by the knob and relative to the body.

8. An outdoor cooking station configured to be gas heated with a propane tank, the outdoor cooking station comprising:
   a main body with gas burners, the gas burners configured to receive pressurized gas therethrough;
   an elongated interconnection member extending between a first end portion and a second end portion, the first end portion sized and configured to be coupled to the propane tank and the second end portion sized and configured to be operatively coupled to the gas burners so that gas can move from the propane tank to the gas burners of the main body; and
   a pressure regulator positioned between the first end portion and the second end portion of the interconnection member, the pressure regulator including:
      a body, the body having a knob rotatably coupled to the body, the knob manually rotatable about an axis defined by the knob, the body defining a gas inlet and a gas outlet;
      an axil linearly movable along the axis upon the knob being rotated;
      a first spring cap positioned directly below the axil and movable with the axil;
      a first spring positioned to bias against an underside surface of the first spring cap, the underside surface extending perpendicular relative to the axis of the knob;
      a diaphragm with a diaphragm plate positioned over the diaphragm, the diaphragm extending between inner sides of the body, the first spring positioned between the first spring cap and the diaphragm plate such that the first spring biases against the diaphragm plate and the underside surface of the first spring cap;
      a second spring cap positioned above diaphragm plate;
      a second spring positioned between the second spring cap and the diaphragm plate;
      a relief pin positioned within the second spring and extending through the diaphragm plate, the relief pin with one end portion coupled to the second spring cap;
      a lever arm positioned within the body and pivotably coupled to a second end portion of the relief pin below the diaphragm, the lever arm extending with an end portion positioned adjacent the gas inlet, the lever arm pivotable via rotation of the knob such that rotation of the knob is configured to adjust gas flow pressure through the body between about 15 inches of water column and about 7.5 inches of water column.

9. The pressure regulator of claim 8, wherein the knob is rotatable to adjust gas flow pressure through the body between about 11 inches of water column and about 8.5 inches of water column.

10. The outdoor cooking station of claim 8, wherein the interconnection member comprises a flexible gas hose extending from the pressure regulator to the second end portion of the interconnection member.

11. The pressure regulator of claim 8, further comprising a compartment, the compartment defined at least partially by the body and the diaphragm, the diaphragm moveable between an expanded position and a compressed position.

12. The pressure regulator of claim 11, wherein, upon the diaphragm being in the compressed position, the lever arm is in a first pivoted position and, upon the diaphragm being in the expanded position, the lever arm is in a second pivoted position.

13. The pressure regulator of claim 11, wherein the diaphragm extends directly alongside the diaphragm plate.

14. The pressure regulator of claim 8, wherein the knob is rotatable to linearly move the relief pin, the relief pin operatively coupled to the first and second springs and the lever arm.

15. The pressure regulator of claim 14, wherein the relief pin is linearly movable along the axis defined by the knob and relative to the body.

16. A method for changing a fuel pressure to gas burners of a cooking station, the method comprising:
   providing a propane tank configured to feed fuel to the gas burners of the cooking station such that an interconnection member extends between the propane tank and the cooking station, the interconnection member having a gas hose and a pressure regulator each extending between the propane tank and the cooking station;
   turning a propane tank knob of the propane tank to an open position;
   rotating a pressure regulator knob of the pressure regulator to move an axil linearly along an axis defined by the pressure regulator knob, the axil moving a first spring cap relative to a diaphragm plate with a first spring positioned and biased between an underside surface of the first spring cap and the diaphragm plate; and
   adjusting a pressure of the propane gas being fed to the cooking station by the rotating of the pressure regulator knob of the pressure regulator such that the pressure of the propane gas being fed through the pressure regulator is adjustable between about 15 inches of water column and about 7.5 inches of water column.

17. The method according to claim 16, wherein the adjusting comprises adjusting the pressure of the propane gas between about 11 inches of water column and about 8.5 inches of water column.

18. The method according to claim 16, wherein the adjusting comprises moving the axil linearly to move an end portion of a lever arm to and from a gas inlet of the pressure regulator.

19. The method according to claim 16, wherein the adjusting comprises minimizing the pressure of the propane gas moving through pressure regulator by expanding a compartment of the pressure regulator such that the compartment is defined at least partially by a flexible diaphragm.

20. The method according to claim 16, wherein the adjusting comprises changing a size of a compartment of the pressure regulator with movement of a flexible diaphragm, the flexible diaphragm moveable with movement of the pressure regulator knob.

21. The method according to claim 20, wherein the changing comprises expanding the compartment to minimize the pressure of the propane gas being fed through the pressure regulator.

* * * * *